United States Patent Office 3,284,500
Patented Nov. 8, 1966

3,284,500
HALOGENATION OF BETA-OXO ACID AMIDES
Charles H. Tieman, Modesto, Calif., assignor to Shell Oil Company, New York, N.Y., a Delaware corporation
No Drawing. Filed Dec. 6, 1963, Ser. No. 328,484
7 Claims. (Cl. 260—561)

This application is a continuation-in-part of application Serial No. 131,088, filed August 14, 1961, now abandoned.

This invention relates to a process for the chlorination of beta-oxo propionic acid amides selectively to form the alpha-monochloro beta-oxo propionic acid amides. In particular, this invention relates to a process for selectively chlorinating amides of acetoacetic acid to the corresponding amides of alpha-monochloroacetoacetic acid.

As is shown in United States Patent No. 2,802,855, carbamylalkenyl esters of acids of pentavalent phosphorus are effective insecticides. One species of this class in particular, dimethyl 1-dimethylcarbamyl-1-propen-2-yl phosphate, has shown toxicity by systemic action toward a wide spectrum of insects, and appears to be particularly useful as a seed-treating agent, and as a systemic insecticide for control of Dutch elm disease in mature trees. Also, the compound has shown promise as an animal systemic insecticide.

As is also shown in the patent, each of these carbamylalkenyl esters can be prepared by reacting an alkyl ester of the corresponding acid of trivalent phosphorus with an alpha-monochloro beta-oxo propionic acid amide. The alpha-monochloro beta-oxo propionic acid amides have customarily been prepared (column 6, lines 35 et seq.; column 3, fourth paragraph, of the patent) by reacting the beta-oxo propionic acid amides with sulfuryl chloride, removing hydrogen chloride formed by the reaction, then recovering the product by distillation. It has been found that this route to the alpha-monochloro beta-oxo propionic acid amides leaves much to be desired, however, since the use of equimolar proportions of the reactants results in the production of substantial amounts of the alpha,alpha-dichloro beta-oxo propionic acid amides, and causes incomplete conversion of the beta-oxo propionic acid amides. This combined effect markedly reduces the amount of the mono-chloro amide product. Further, if the crude product containing the dichloro amide is used in preparing the insecticide, the crude insecticide contains a substantial amount of the carbamyl-monochloroalkenyl ester; the carbamyl-monochloroalkenyl ester has a higher mammalian toxicity than its non-chlorinated counterpart, so that the presence of the chlorinated material virtually precludes the use of the crude product for treating animals. The unreacted amide dilutes the insecticide product. It is very difficult to separate the monochloro beta-oxo propionic acid amide from the crude product because of the similarity in boiling points and other physical properties of the unreacted amide, the mono- and dichloro-amides. For the like reasons, it is very difficult to separate the carbamyalkenyl ester from the carbamyl-chloroalkenyl ester in the crude insecticide product. Use of less than the equivalent amount of the sulfuryl chloride effects some reduction in the proportion of the dichloro-amide by-product, but simultaneously causes a substantial reduction in the conversion of the amide.

It now has been discovered that if the reaction of the beta-oxo propionic acid amide and sulfuryl chloride is carried out in the presence of a halogenated lower alkane as diluent, the amount of dichloro-amide by-product is very substantially reduced with consequent substantial increase in the amount of the monohalo-amide product, yet with no decrease in the conversion of the amide. Thus, for example, where N,N-dimethylacetoacetamide is reacted at about 20° C. with an equivalent amount of sulfuryl chloride in the absence of any diluent, the conversion of the amide ordinarily is about 85%, with a yield of monochloro-amide of about 70% (mole), and a yield of dichloro-amide of about 21% (mole), but if the reaction is carried out under identical conditions except in the presence of a halogenated lower alkane, such as methylene dichloride or chloroform, the conversion of the amide ordinarily is about 96%, with the yield of monochloro-amide being about 95% (mole), and the yield of dichloroamide being but about 5% (mole). Typically, the yield of the dichloro-amide therefore is reduced by about 76%, with corresponding increase in yield of monochloro-amide, and with increased conversion of the amide-starting material.

Since the reaction of the amide and sulfuryl chloride is otherwise conducted in substantially the same manner as is taught in the prior art, generically speaking the invention is an improvement to the prior art process comprising conduct of the reaction in the presence of at least one halogenated lower alkane as diluent.

The character of the beta-oxo propionic acid amides is set forth in U.S. 2,802,855; generically they can be defined by the formula:

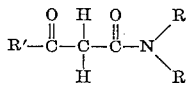

wherein R taken singly is hydrogen, a monovalent lower molecular weight hydrocarbon radical, or a monovalent lower molecular weight substituted hydrocarbon radical, and taken together in combination are a divalent hydrocarbon radical, and R' is a lower molecular weight hydrocarbon radical, or a lower molecular weight substituted hydrocarbon radical.

Such amides are described inter alia in U.S. Patents Nos. 2,145,617, 2,152,132, 2,323,938 and 2,561,205, as well as in U.S. No. 2,802,855.

Because of the properties of the insecticides prepared therefrom, it is preferred that each of the organic groups represented by R and R' contain not more than 10 carbon atoms. The groups represented by R and R' can be aliphatic, cycloaliphatic, aromatic, or of mixed structure. When aliphatic, they may be either straight-chain or branched-chain in configuration; they may be saturated or olefinically unsaturated, but preferably are free from acetylenic unsaturation. Typewise, the suitable hydrocarbon groups include alkyl, cycloalkyl, aryl, aralkyl, and the like. Illustrative examples include the methyl, ethyl, n- and isopropyl groups, the various isomeric butyl, pentyl, hexyl, octyl, nonyl, and the like alkyl groups; the cyclopentyl, cyclohexyl and like cycloalkyl groups; the phenyl group; the naphthyl group, the benzyl, phenylethyl, p-methylbenzyl, and alpha-methylbenzyl groups, and like aralkyl groups; the isomeric xylyl groups, the ethylphenyl groups, the 2,4- and 3,5-dimethylphenyl groups, and like alkaryl groups, and the like.

The suitable substituted hydrocarbon groups are those of the foregoing hydrocarbon groups which are substituted by one or more non-hydrocarbon substituents. The preferred substituents are halogen, particularly the middle halogens, bromine and chlorine; the nitro group, the cyano group; the amino groups represented by the formula

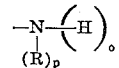

wherein R has the meaning set out herein, o is 0, 1 or 2, and o+p=2; non-acidic functional groups involving oxy (—O—) oxygen, and amido groups having the amino moiety set out above, and including amido groups of the formulae

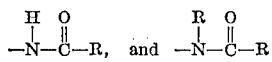

By "non-acidic" functional groups involving oxy (—O—) oxygen is meant the hydroxy group, ether groups

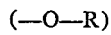

ester groups (—C(O) OR), and ether and/or ester groups containing other ether linkages.

Illustrative examples of the non-hydrocarbon groups include mono-haloalkyl groups, such as the chloromethyl and bromomethyl groups, the 2-chloroethyl, 1-bromopropyl, 3-chloropropyl groups and the like; 1,2-dichloroethyl, 2,2-dibromoethyl, 3,3-dichloro-2-bromopropyl groups and the like; nitroalkyl groups such as the 2-nitroethyl group; halo-substituted aromatic groups such as the various isomeric chloro- and bromophenyl groups, the various isomeric polyhalophenyl groups, such as the 2,4- and 2,6-dichlorophenyl groups, the 3,5-dibromophenyl group, and the like; amino-substituted groups, such as the 2-aminoethyl group, and 2-dimethylaminoethyl group and the like; the aniline group, the p-dimethylaminophenyl group, the p-ethylaminobenzyl group; the isomeric nitro-substituted phenyl groups, the isomeric nitro-substituted benzyl groups, the methoxymethyl group, the 2-methoxyethyl group, the methoxycarbonyl group, the methoxycarbonylmethyl group, the 2-methoxycarbonethyl group, the 2-methoxycarbonylethoxyethyl group, the benzyloxycarbonyl group and the like.

In those amides wherein both of R together represent a divalent radical, it is preferred that the divalent radical is an alkylene or alkylene-oxy-alkylene group of up to 10 carbon atoms, with from 4 to 5 carbon atoms in the chain thereof, as in the piperidino and morpholino groups.

As indicated in U.S. 2,802,855, the preferred amides are those wherein R is hydrogen, alkyl of up to 10 carbon atoms, nitro-substituted monocyclic aryl or alkaryl, monocyclic aryl substituted by middle halogen (bromine and chlorine), alkoxy-substituted monocyclic aryl, cyano-substituted monocyclic aryl or acyl-substituted monocyclic aryl (acyl=alkyl—C(O)—), of up to 10 carbon atoms, and R' is one of the organic groups represented by R. Of these amides, the beta-oxo-lower alkanoic acid amides, particularly those wherein each of R and R' represents alkyl of from 1 to 10 carbon atoms are of particular interest, the N,N-dialkylacetoacetamides of this class being most of interest because of the high activity of the insecticides which can be prepared therefrom.

The suitable solvents are the halogenated lower molecular weight alkanes, for example, containing up to five carbon atoms and preferably boiling above 0° C. but below about 120° C. Specific examples include methylene chloride, methylene bromide, chloroform, carbon tetrachloride, methyl bromide, 1,1- and 1,2-dichloroethane, 1,2-dichloroethylene, propyl and isopropyl chlorides, butyl chloride, sec-butyl chloride, 1,2-, and 1,3-dichloropropane, propyl iodide, propyl bromide, 1,1,2-trichloroethane, 1,1,1-trichloroethane, amyl chloride, and the like. In the majority of cases wherein the amide reactant is an amide of acetoacetic acid, the polychloro alkanes, i.e., methylene chloride, chloroform and carbon tetrachloride, are effective, are cheap and readily available, and therefore are most convenient.

The chlorination is conducted by reacting the amide with substantially an equal number of moles of sulfuryl chloride in the presence of the haloalkane diluent, generally at a temperature not exceeding about 100° C., and preferably at a temperature not exceeding about 40° C. It is preferred not to use more than one mole of the sulfuryl chloride per mole of the amide, for the presence of excess sulfuryl chloride tends to favor the formation of the undesired dichloro-amide by-product. An excess of the amide can be used, and favors production of the monochloro-amide product; however, since this is accomplished by reduction in the amount of amide converted, it is usually desirable to avoid any large excess of the amide. In general, it will be found desirable to use not more than about 1.2 moles of amide per mole of the sulfuryl chloride, and in most cases, it will be found best to employ essentially one mole of amide per mole of the chloride. Lower reaction temperatures favor formation of the monchloro-amide product; consequently, it is preferred to employ temperatures below about 30° C. Because of the practical difficulties in attaining and maintaining low temperatures on a large scale, it is preferred not to use temperatures below about 0° C.

At least about 1.5 volumes of diluent should be provided per volume of the amide reactant and preferably at least about 2.0 volumes of diluent are provided per volume of the amide. Diluent/amide volume ratios in excess of about 20/1 are not desirable, since use of larger amounts of diluent provide little additional advantage, and involve additional problems in effecting the recovery of the product. In most cases, it will be found that diluent/amide volume ratios of less than about 15/1, or even less than about 10/1 are suitable and further minimize problems of product recovery. In many, if not most cases, use of diluent/amide volume ratios of from about 2/1 to about 10/1 will be found best. Not all of the diluent need be present at the outset of the reaction, and a part of the diluent can be added with the sulfuryl chloride. However, a substantial part—say, 40% or more—of the diluent should be present in the initial reaction mixture.

Preferably, to assure control of the reaction and avoid excessive local reaction temperatures, the sulfuryl chloride is gradually added to the amide in the presence of a substantial amount of the diluent, the mixture being well stirred. To further moderate the reaction, and avoid local high temperatures, it is desirable that the sulfuryl chloride be mixed with diluent. The rate at which the sulfuryl chloride can be added to the amide will depend to a very substantial extent upon the thoroughness of mixing—if adequate mixing is maintained, the sulfuryl chloride can be added quite rapidly, but if only poor mixing can be maintained, then the sulfuryl chloride should be added very slowly.

Ordinarily, it will be found most convenient to remove the by-product hydrogen halide after the reaction is complete, by heating the mixture to drive off the hydrogen chloride. If a suitable solvent, such as di-, tri- or tetrachloro-methane, is used, the hydrogen chloride can be removed by refluxing the reaction mixture. Generally, it will be found desirable to afterward treat the resulting mixture with a mild base, such as sodium bicarbonate, to remove any traces of hydrogen chloride still remaining therein. The desired product can be recovered by distilling the hydrogen chloride-free mixture to remove the diluent, and redistilling the bottoms product, if necessary, to remove any heavy ends that may have been formed. To avoid decomposition of the product, it is preferable to employ reduced pressure distillation techniques.

The effect of the diluent on the formation of mono- and dichloroamides is shown by the results of the following experiments, in which N,N-dimethylacetoacetamide was chlorinated with sulfuryl chloride. Reaction temperature: 20° C. 1:1 mole ratio of reacants. Diluent: methylene chloride.

TABLE I

| Volume ratio, diluent/amide | Conversion (percent) of $SO_2Cl_2$ | |
|---|---|---|
| | To Monochloro-amide | To Dichloro-amide |
| 0 (no diluent used) | 67 | 33 |
| 1/1 | 75 | 25 |
| 2.5/1 | 83 | 17 |
| 5/1 | 92 | 8 |

Similar results were obtained using chloroform and carbon tetrachloride as diluents.

I claim as my invention:

1. In the process for preparing alpha-chloro-beta-oxo-lower alkanoic acid amides, containing only hydrogen atoms and lower alkyls on the amide nitrogen, by reaction of the corresponding beta-oxo-lower alkanoic acid amides and sulfuryl chloride, the improvement which comprises conducting the reaction in the liquid phase at a temperature below about 100° C. in the presence of from about 1.5 to 20 volumes of diluent per volume of amide, said diluent being at least one halogenated lower alkane wherein each halogen has an atomic number from 17 to 35.

2. The improvement according to claim 1 wherein the amide reactant is an N,N-dialkylacetoacetamide.

3. The improvement according to claim 2 wherein the diluent is a polychlorinated methane.

4. In the process for preparing alpha-chloro-beta-oxo-lower alkanoic acid amides, containing only hydrogen atoms and lower alkyls on the amide nitrogen, by reaction of the corresponding beta-oxo-lower alkanoic acid amides and sulfuryl chloride, the improvement which comprises conducting the reaction in the liquid phase at a temperature below about 40° C. in the presence of from about 1.5 to 20 volumes of diluent per volume of amide, said diluent being at least one halogenated lower alkane wherein each halogen has an atomic number from 17 to 35.

5. In the process for preparing alpha-chloro-N,N-dimethylacetoacetamide by reaction of N,N-dimethylacetoacetamide and sulfuryl chloride, the improvement which comprises conducting the reaction in the liquid phase at a temperature below about 40° C. in the presence of from about 1.5 to 20 volumes per volume of amide of a polychlorinated methane.

6. The process of claim 5 wherein the polychlorinated methane is methylene chloride.

7. The process of claim 5 wherein the temperature is about 20° C.

No references cited.

WALTER A. MODANCE, *Primary Examiner.*

NATALIE TROUSOF, *Assistant Examiner.*